(12) United States Patent
Gentle

(10) Patent No.: US 7,342,879 B2
(45) Date of Patent: Mar. 11, 2008

(54) METHOD AND APPARATUS FOR DETECTION OF PRIORITIZATION AND PER HOP BEHAVIOR BETWEEN ENDPOINTS ON A PACKET NETWORK

(75) Inventor: Christopher Reon Gentle, Gladesville (AU)

(73) Assignee: Avaya Technology Corp., Basking Ridge, NJ (US)

( * ) Notice: Subject to any disclaimer, the term of this patent is extended or adjusted under 35 U.S.C. 154(b) by 943 days.

(21) Appl. No.: 10/435,426

(22) Filed: May 9, 2003

(65) Prior Publication Data
US 2004/0223458 A1 Nov. 11, 2004

(51) Int. Cl.
*H04B 17/00* (2006.01)
(52) U.S. Cl. .................. 370/230; 370/252; 709/224
(58) Field of Classification Search ........... 370/235, 370/229, 241, 252, 230
See application file for complete search history.

(56) References Cited

U.S. PATENT DOCUMENTS

2003/0161265 A1* 8/2003 Cao et al. .................. 370/229
2004/0114583 A1* 6/2004 Cetin et al. ................. 370/360
2006/0087969 A1* 4/2006 Santiago et al. ............ 370/229

OTHER PUBLICATIONS

Bernet, at el, "A Freamework for Intergrated Services Operation over Diffserv Networks", RCF2998, Nov. 2000, The Internet Society.

* cited by examiner

*Primary Examiner*—Hassan Kizou
*Assistant Examiner*—Jeffrey M Rutkowski
(74) *Attorney, Agent, or Firm*—John C. Moran

(57) ABSTRACT

An apparatus and method to allow a packet network endpoint to determine if its media traffic is being properly communicated via a network.

34 Claims, 7 Drawing Sheets

METHOD AND APPARATUS FOR DETECTION OF PRIORITIZATION AND PER HOP BEHAVIOR BETWEEN ENDPOINTS ON A PACKET NETWORK

TECHNICAL FIELD

The present invention relates to communication systems, and, in particular, to monitoring networks utilized for the transmission of voice and other media information.

BACKGROUND OF THE INVENTION

Within the prior art, there exists a problem of assuring that certain types of media being transported over a data network have sufficient bandwidth. One type of media for which such assurance is needed is voice-over-IP (VoIP). The prior art has attempted to remedy this problem by establishing the ability to guarantee bandwidth through the different network elements, such as routers, through the use of the Resource ReSerVation Protocol (RSVP). RSVP is a protocol that allows an endpoint to negotiate with a RSVP capable network to allocate network resources to protect that traffic that the endpoint will generate. However, not every network element may support the ability to reserve bandwidth through the use of RSVP but will respond to such a reservation request by simply ignoring it and providing the lowest level of support for packets (best effort). To remedy this problem, the concept of Differentiated Service (DiffServ) was introduced. DiffServ allows applications to mark their traffic so that routers can forward each packet according to a level of routing service such as a predefined forwarding behavior (routing priority) or/and a drop precedence. In this way, DiffServ is unaware of specific application flow requirement and instead, works with IP traffic at an aggregate level. The DiffServ code points are included in each packet, and the network elements are configured to the level of service defined for that DiffServ code point. However, if a network element is not properly configured, the network element may simply provide the default (lowest) level of service or a different level of service may be defined for the DiffServ code point than that actually intended by sender of the packet. There are many different levels of service that can be specified by a DiffServ code point. Three examples are the lowest level which is best effort, better than best effort, and the highest level which is expedited forwarding. In general, VoIP traffic is transmitted with reservations set up by RSVP or by setting the DiffServ code point on each packet to request expedited forwarding. However, a known technique in the field is to transmit calls at the expedited forwarding level until insufficient bandwidth exists to transmit new calls at that level and then using better than best effort DiffServ code points to transmit new voice traffic. However, if one or more network elements do not support the DiffServ code point that specifies better than best effort, these network elements may simply service the VoIP packets (also referred to as media packets) at the best effort level, which is the lowest level, and normally is the level utilized for the transmission of other Internet data traffic. Two other levels are better than best effort and expedited forwarding which is the highest level for transmission priority.

FIG. 1 illustrates a prior art system which combines the utilization of RSVP with DiffServ code points to provide service between corporate location 101 and corporate location 102 for VoIP and video media transmission. A call is set up from communication terminal 104 to communication terminal 108 via network element 106, service provider 103 and network element 107. The call is set up utilizing RSVP reservations, however, only the two corporate site network elements provide this service. The network elements within service provider 103 do not support RSVP hence the DiffServ code points are utilized to establish the level of routing service such as a predefined forwarding behavior (routing priority) or/and a drop precedence. The RSVP usage is used to achieve an access control function from the corporate sites to service provider 103. In general, the service provider 103 guarantees only a certain level of service of so much bandwidth between the two corporate locations. The network elements 106 and 107 will only allow the establishment of reserve bandwidth utilized as determined by the RSVP's request to this guaranteed level through service provider 103. The DiffServ code points are then utilized so that the network elements within the service provider 103 will provide sufficient service for the VoIP traffic.

The system illustrated in FIG. 1 functions properly as long as each network element in service provider 103 recognizes and provides the level of service specified by the DiffServ code points being received in each of the packets from the corporate locations 101 and 102. However, if some or many of the network elements are not properly provisioned to react to the DiffServ code points in the proper manner than the service between the corporate locations 101 and 102 can suffer. The network elements may fail to recognized the DiffServ code point information at all and thus simply provide the best effort level or may recognize the DiffServ code point number but provide a different level of service than that intended by the sending terminal such as communication terminal 104.

The prior art has approached this problem of assuring the correct of service for a particular DiffServ code point by allowing DCLASS extensions to RSVP as set forth in RFC2996 that allows a VoIP device to be informed of the DiffServ code point number that best meets its requirements based on an RSVP reservation request. Also, network nodes such as routers may be populated in the Management Information Base (MIB) of the Simple Network Management Protocol (SNMP) to allow network management tools to access DiffServ configurations and state information. Finally, different assessment tools such as ExamiN from Avaya, Inc. and Chariot from NetIQ, Inc. use traffic injection and measurement to determine if aggregate quality of service is sufficient. The problem with the prior art solutions is that they do not provide a mechanism for a simple communication terminal to verify the quality of service offered by the network is what the terminal is configured to expect.

SUMMARY OF THE INVENTION

The aforementioned problems are solved and a technical advance is achieved in the art by an apparatus and method that allow a network endpoint to determine if its media traffic is being properly communicated via a network.

DETAILED DESCRIPTION

Figure 1:
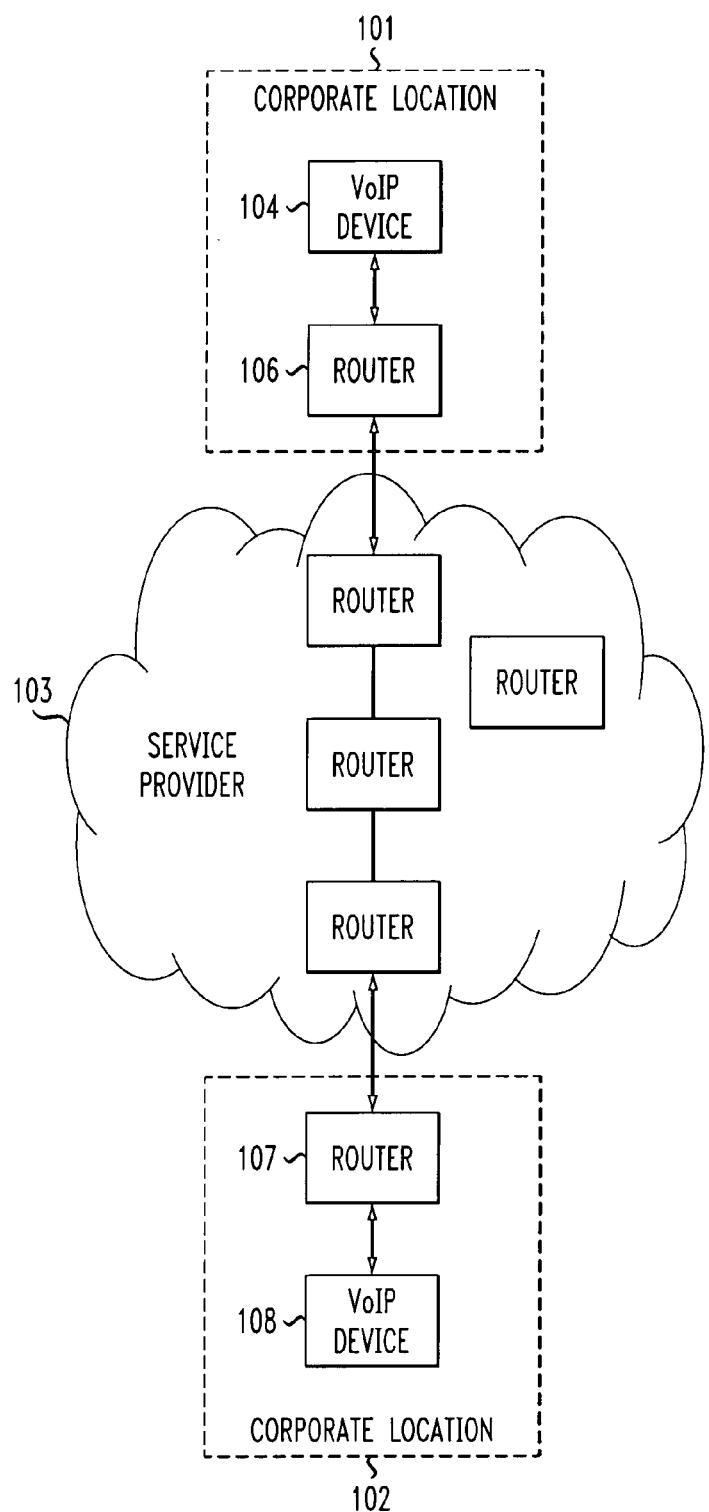
FIG. 1 illustrates a prior art system utilizing RSVP and DiffServ functions.
Figure 2:
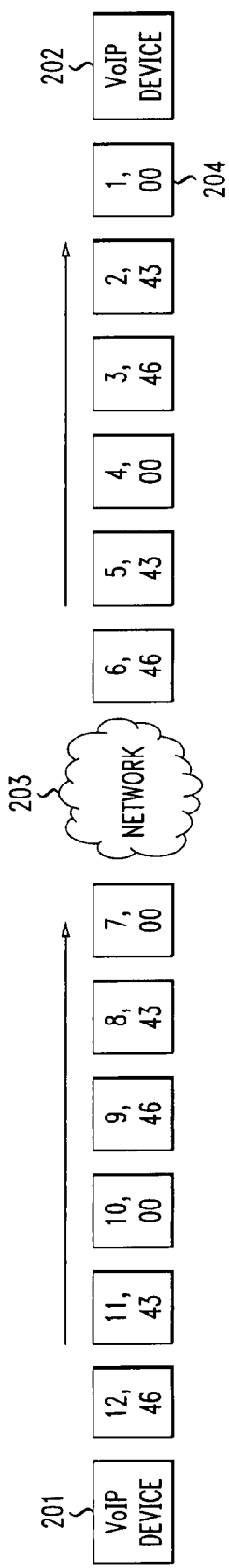
FIG. 2 illustrates, in block diagram form, an embodiment in accordance with the invention.

FIG. 2 illustrates an embodiment of the invention in pictorial form. VoIP device 201 transmits bursts of packets marked with DiffServ code points that the VoIP device wants to verify that network 203 is in compliance. One skilled in the art would immediately realize that other media and data devices other than VoIP devices could uses this embodiment to assure transmission quality. In this example, the sequence of numbered packets marked with "best effort","better than best effort", and "expedited forwarding" DiffServ code points are sent in bursts, using very small. and varying sized packets. VoIP device 201 varies the packet sizes and data to cause overflow router queues and trigger prioritization events. Receiving VoIP device 202 analyzes the sequence numbers to determine the order and dropped rate of each packet. After a time, packet loss of each DiffServ code point is statistically compared with itself. In a correctly provisioned network, the packet loss should be greater for "best effort" packets than "better than best effort" packets, and both "best effort" and "better than best effort" should have greater packet loss than "expedited forwarding packets". Further, out of order packets can indicate class problems. If packets regularly regress out of sequence in such a way that indicates that they are not being prioritized according to the expected per hop behavior, then it is evident that the path between two hosts is or is not configured as expected with respect to the DiffServ code points. In another embodiment, the test traffic is reflected back from VoIP device 202 to VoIP device 202 along the return path thus increasing the probability of observing a deviation in the per-hop-behaviors of the network's elements.

In yet another embodiment, VoIP device 201 and VoIP device 202 may be severs and be utilized to do network assessment by generating heavy traffic.

In another embodiment of the invention, VoIP device 201 and VoIP device 202 are communication terminals which during their normal operation embed, relatively unobtrusively, the flow of test packets (also referred to as media test packets) that are marked with the DiffServ code points that the communication terminal wants to verify compliance. If the communication terminal after a period of time observes that there is a problem, the communication terminal may set an alarm indicating that the network is not properly provisioned. Also, sequencing application packets (also referred to as media packets) may help detect non-compliance without any extra packets being injected.

Consider FIG. 2 now in greater detail. VoIP device 201 transmits packets through network 203 to VoIP device 202. As illustrated in FIG. 2, the packets leaving network 203 at the network egress are still in sequential order; but if network 203 is not proper provisioned, the packets leaving network 203 would not be in sequential order or some packets would have been lost. The sequential order is indicated by the first number in the packets followed by the DiffServ code point. For example, the packet 204 has an order number of 1 and a DiffServ code point of 00. A DiffServ code point equal to 00 designates best effort, a DiffServ code point of 43 indicates better than best effort, and a DiffServ code point of 46 indicates expedited forwarding. If VoIP device 202 determines that packets marked with a DiffServ code point of 00 are moved out of order relative to packets marked with a DiffServ code point of 46 but not packets marked with a DiffServ code point of 43 this then is an indication that the preferentially treated packets with a DiffServ code point of 46 are being correctly handled within network 203, hence that network 203 is correctly provisioned with respect to a DiffServ code point of 46. However, it is a clear indication that the DiffServ code point of 43 is not correctly provisioned within network 203 since it is being given the same prioritization as packets with DiffServ code point 00, which is the lowest level.

In addition, in an embodiment where VoIP device 202 reflects the packets back to VoIP device 201, VoIP device 201 can determine, based on the packet loss, whether the network 203 is properly responding to the DiffServ code points. For example, if packets with a DiffServ code point of 43 are being dropped by network 203 at approximately the same rate as packets with a DiffServ code point of 00 then it is safe to assume that network 203 is not properly provisioned with respect to DiffServ code point 43.

Other embodiments of the invention could be used with TOS precedence-based networks.

Figure 3:
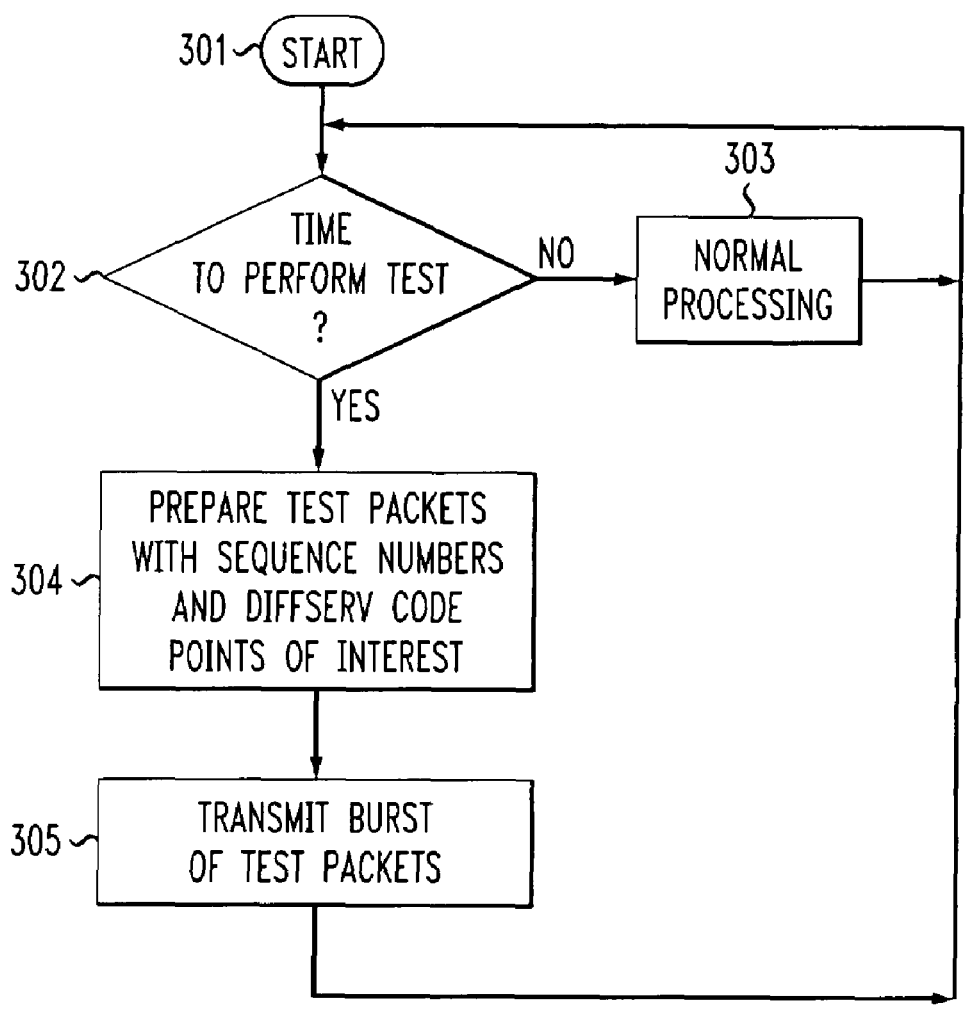
FIGS. 3 and 4 illustrate, in flowchart form, operations performed by an embodiment in accordance with the invention.
Figure 4:
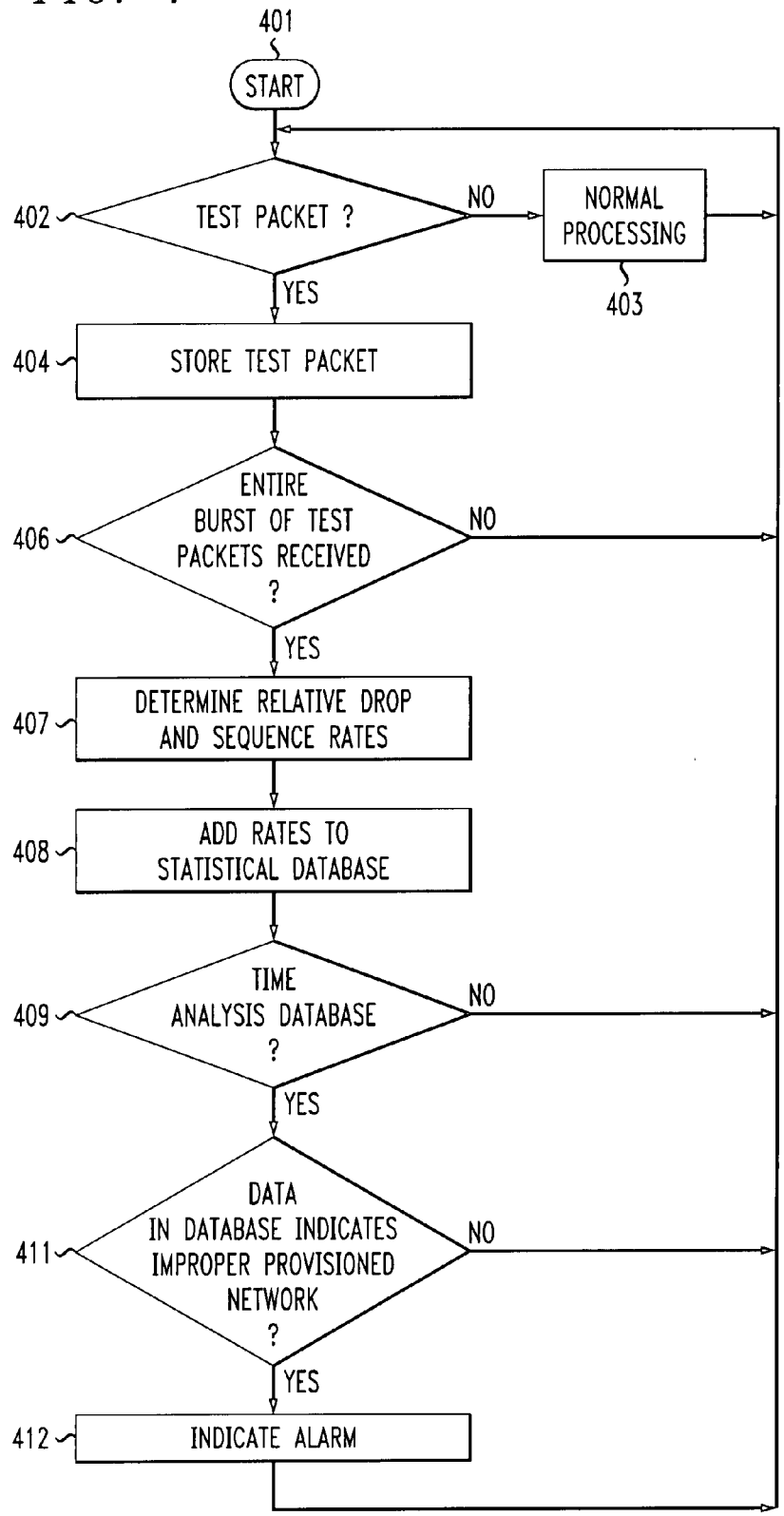

FIGS. 3 and 4 illustrate, in flowchart form, operations performed by an embodiment of the invention. FIG. 3 illustrates the operations performed by a sending terminal such as VoIP device 201 of FIG. 2. After being started in block 301, decision block 302 determines if it is time to perform a test. Advantageously, the test would consist of transmitting a known burst of packets to the receiving terminal such as VoIP device 202 of FIG. 2. If the answer is no in decision block 302, block 303 performs normal processing before transferring control back to decision block 302. If the answer is yes in decision block 302, block 304 prepares the test packets with sequence numbers and DiffServ code points of interest before transferring control to block 305. Block 305 transmits the prepared burst of test packets before returning control back to decision block 302. In another embodiment of the invention, the size of the burst of test packets may be varied with time.

FIG. 4 illustrates the operations performed by a receiving terminal. After being started in block 401, decision block 402 determines if a test packet has been received. If the answer is no, block 403 performs normal processing before transferring control back to block 402. If the decision in decision block 402 is yes, block 404 stores the test packet.

Next, decision block 406 determines if the entire burst of test packets has been received. Note, if packets have been dropped there will be fewer packets than transmitted by the sending terminal. However, one skilled in the art could readily envision various embodiments for determining when the entire burst had been received. For example, the embedded sequence numbers could be utilized to make this determination. In addition, the number of packets in the burst could be included in each packet or timing could be performed from the reception of the first packet until some predefined period of time had elapsed. If the decision in decision block 406 is no, control is transferred back to decision block 402.

If the answer is yes in decision block 406, control is transferred to block 407 which determines the relative drop and sequence rates for the present burst of packets. Block 407 is determining differences between the drop rate in sequencing of the various DiffServ code point coded packets. After execution of block 407, block 408 adds the determined rates into a statistical database before transferring control to decision block 409. The latter decision block determines if it is time to analyze the information in the database. This time may be predefined or variable. If the answer is no, control is transferred back to decision block 402. If the answer in decision block 409 is yes, decision block 411 determines if the data in the database indicates an improperly provisioned network. If the answer is no, control is transferred back to decision block 402. If the answer is yes in decision block 411, block 412 may indicate an alarm utilizing techniques well known to those skilled in the art before transferring control to decision block 402.

Figure 5:
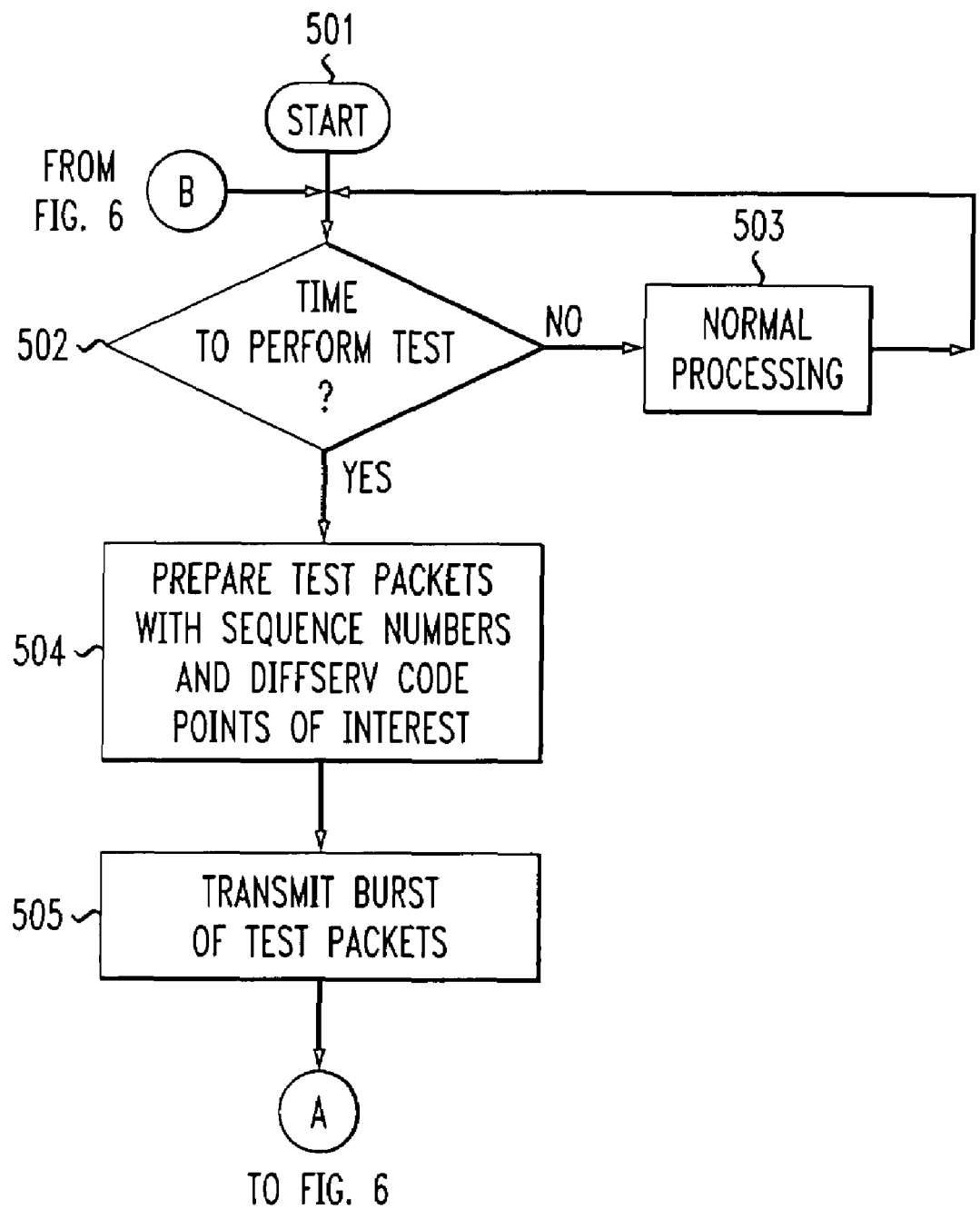
FIGS. 5 and 6 illustrate, in flowchart form, operations performed by an embodiment in accordance with the invention.
Figure 6:
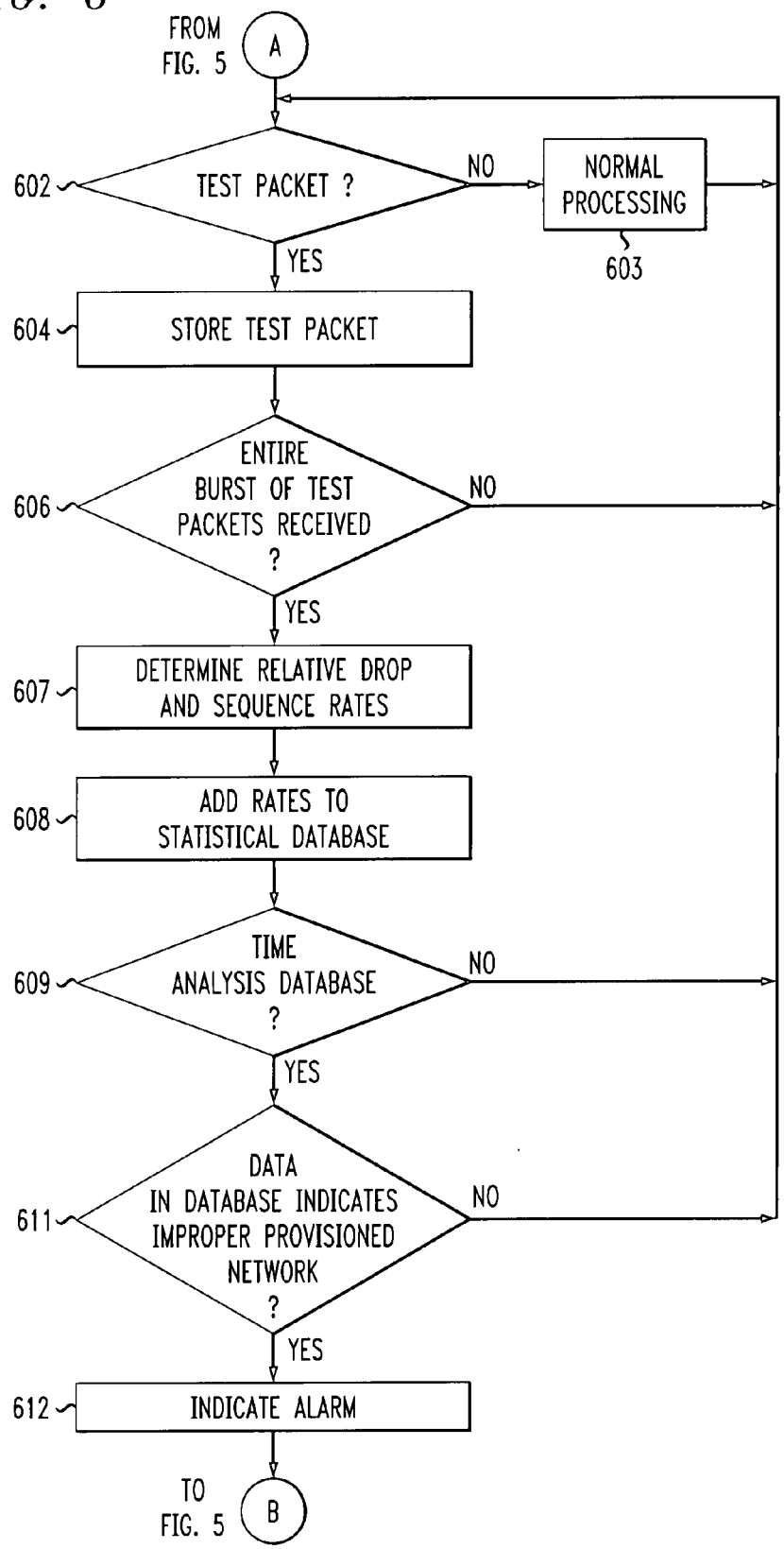

FIGS. 5 and 6 illustrate, in flowchart form, the operations performed by a sending terminal, such as VoIP device 201, when the burst of test packets are being reflected back by VoIP device 202 to VoIP device 201 via network 203. After being started in block 501, decision block 502 determines if it is time to perform a test. Advantageously, the test would consist of transmitting a known burst of packets to the receiving terminal such as VoIP device 202 of FIG. 2. If the answer is no in decision block 502, block 503 performs normal processing before transferring control back to decision block 502. If the answer is yes in decision block 502, block 504 prepares the test packets with sequence numbers and DiffServ code points of interest before transferring control to block 505. Block 505 transmits the prepared burst of test packets before transferring control back to decision block 602 of FIG. 6. In another embodiment of the invention, the size of the burst of test packets may be varied with time.

Decision block 602 determines if a test packet has been received. If the answer is no, block 603 performs normal processing before transferring control back to block 602. If the decision in decision block 602 is yes, block 604 stores the test packet.

Next, decision block 606 determines if the entire burst of test packets has been received. Note, if packets have been dropped there will be fewer packets than transmitted by the sending terminal. However, one skilled in the art could readily envision various embodiments for determining when the entire burst had been received. For example, the embedded sequence numbers could be utilized to make this determination. In addition, the number of packets in the burst could be included in each packet or timing could be performed from the reception of the first packet until some predefined period of time had elapsed. If the decision in decision block 606 is no, control is transferred back to decision block 602.

If the answer is yes in decision block 606, control is transferred to block 607 which determines the relative drop and sequence rates for the present burst of packets. Block 607 is determining differences between the drop rate in sequencing of the various DiffServ code point coded packets. After execution of block 607, block 608 adds the determined rates into a statistical database before transferring control to decision block 609. The latter decision block determines if it is time to analyze the information in the database. This time may be predefined or variable. If the answer is no, control is transferred back to decision block 602. If the answer in decision block 609 is yes, decision block 611 determines if the data in the database indicates an improperly provisioned network. If the answer is no, control is transferred back to decision block 602. If the answer is yes in decision block 611, block 612 may indicate an alarm utilizing techniques well known to those skilled in the art before transferring control to decision block 502 of FIG. 5.

Figure 7:
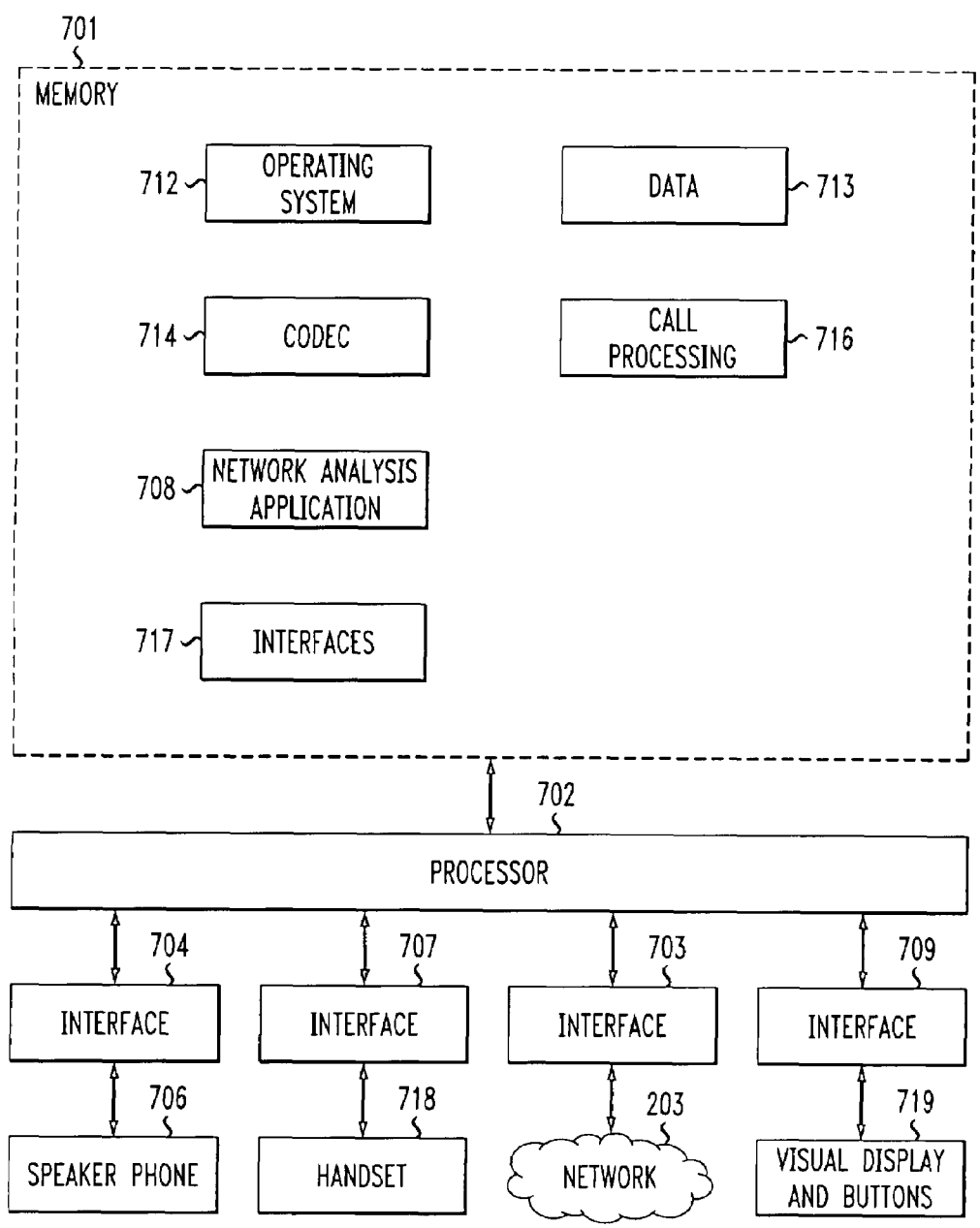
FIG. 7 illustrates, in block diagram form, an embodiment of a network endpoint in accordance with the invention.

FIG. 7 illustrates, in block diagram form, one embodiment of a network endpoint such as VoIP device 104. Processor 702 provides the overall control for the functions of VoIP device 104 by executing programs and storing and retrieving data from memory 701. Processor 702 connects to network 73 via interface 703. Processor 702 interfaces to handset 718 via interface 707 and connects to visual display and buttons 719 via interface 709. Visual display and buttons 719 is all of the indicators, buttons keypad, and display for a VoIP device. Processor 702 performs the operations of VoIP device 104 by executing the routines illustrated in memory 701.

Operating system 712 provides the overall control and the necessary protocol operations. Data is stored in data block 713. CODEC 714 encodes and decodes the audio information for communication with handset 718 or conference speaker and microphone 706 for communication with network 103. Overall control of the call processing is performed by the VoIP device 104 under the control of call processing routine 716. The communication and control of the various interfaces illustrated in FIG. 7 is provided by interfaces routine 717. Network analysis application 708 controls the operations illustrated in FIGS. 3-6.

When the operations of an VoIP device are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The VoIP device can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where the VoIP device is implemented in hardware, the VoIP device can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages.

It is therefore intended that such changes and modifications be covered by the following claims except insofar as limited by the prior art.

What is claimed is:

1. A method of evaluating routing performance within a switching network, comprising the steps of:
   transmitting a set of media packets via the switching network with each of the media packets comprising information for defining a different level of routing service selected from one or both of a routing priority or a drop precedence;
   receiving the set of media packets;
   determining received packets with communication problems;
   statistically accumulating received packets with communication problems by level of routing service; and
   indicating a routing problem upon higher level of routing service media packets with communication problems having a greater statistical occurrence than lower level of routing service media packets with communication problems wherein the indicated problem is that the switching network is not correctly configured for the higher level of routing service.

2. The method of claim 1 wherein the level of routing service is defined by DiffServ code points.

3. The method of claim 1 wherein the level of routing service is defined by TOS precedence.

4. The method of claim 1 wherein the communication problems are selected from one or both of packet drop rate problems or sequence problems.

5. The method of claim 1 wherein the step of transmitting is performed by a network endpoint.

6. The method of claim 5 wherein the steps of receiving, determining, accumulating and indicating are performed by another network endpoint.

7. The method of claim 1 wherein the steps of transmitting, receiving, determining, accumulating and indicating are performed by a network endpoint.

8. A method of evaluating routing performance within a switching network, comprising the steps of:
   transmitting a set of media packets via the switching network with each of the media packets comprising information for defining a different level of routing service selected from one or both of a routing priority or a drop precedence;
   a transmitting a set of media test packets via the switching network with each of the media test packets comprising information for defining the different level of routing service;
   receiving the set of media test packets;
   determining received media test packets with communication problems;
   statistically accumulating received media test packets with communication problems by level of routing service; and
   indicating a routing problem upon higher level of routing service media test packets with communication problems having a greater statistical occurrence than lower level of routing service media test packets with communication problems wherein the indicated problem is that the switching network is not correctly configured for the higher level of routing service.

9. The method of claim 8 wherein the level of routing service is defined by DiffServ code points.

10. The method of claim 8 wherein the level of routing service is defined by TOS precedence.

11. The method of claim 8 wherein the communication problems are selected from one or both of packet drop rate problems or sequence problems.

12. The method of claim 8 wherein the step of transmitting is performed by a network endpoint.

13. The method of claim 12 wherein the steps of receiving, determining, accumulating and indicating are performed by another network endpoint.

14. The method of claim 8 wherein the steps of transmitting, receiving, determining, accumulating and indicating are performed by a network endpoint.

15. The method of claim 8 wherein the step of transmitting the set of media test packets comprises the steps of varying sizes of the media test packets; and varying transmission rate of the media test packets.

16. A tangible computer-readable medium for evaluating routing performance within a switching network, comprising computer-executable instructions configured for:
   transmitting a set of media packets via the switching network with each of the media packets comprising information for defining a different level of routing service selected from one or both of a routing priority or a drop precedence;
   receiving the set of media packets;
   determining received packets with communication problems;
   statistically accumulating received packets with communication problems by level of routing service; and
   indicating a routing problem upon higher level of routing service media packets with communication problems having a greater statistical occurrence than lower level of routing service media packets with communication problems wherein the indicated problem is that the switching network is not correctly configured for the higher level of routing service.

17. The tangible computer-readable medium of claim 16 wherein the level of routing service is defined by DiffServ code points.

18. The tangible computer-readable medium of claim 16 wherein the level of routing service is defined by TOS precedence.

19. The tangible computer-readable medium of claim 16 wherein the communication problems are selected from one or both of packet drop rate problems or sequence problems.

20. The tangible computer-readable medium of claim 16 wherein the transmitting is performed by a network endpoint.

21. The tangible computer-readable medium of claim 20 wherein the receiving, determining, accumulating and indicating are performed by another network endpoint.

22. The tangible computer-readable medium of claim 16 wherein the transmitting, receiving, determining, accumulating and indicating are performed by a network endpoint.

23. A tangible computer-readable medium for evaluating routing performance within a switching network, comprising computer-executable instructions configured for:
   transmitting a set of media packets via the switching network with each of the media packets comprising information for defining a different level of routing service;
   transmitting a set of media test packets via the switching network with each of the media test packets comprising information for defining the different level of routing service selected from one or both of a routing priority or a drop precedence;
   receiving the set of media test packets;

determining received media test packets with communication problems;

statistically accumulating received media test packets with communication problems by level of routing service; and indicating a routing problem upon higher level of routing service media test packets with communication problems having a greater statistical occurrence than lower level of routing service media test packets with communication problems wherein the indicated problem is that the switching network is not correctly configured for the higher level of routing service.

24. The tangible computer-readable medium of claim 23 wherein the level of routing service is defined by DiffServ code points.

25. The tangible computer-readable medium of claim 23 wherein the level of routing service is defined by TOS precedence.

26. The tangible computer-readable medium of claim 23 wherein the communication problems are selected from one or both of packet drop rate problems or sequence problems.

27. The tangible computer-readable medium of claim 23 wherein the transmitting is performed by a network endpoint.

28. The tangible computer-readable medium of claim 27 wherein the receiving, determining, accumulating and indicating are performed by another network endpoint.

29. The tangible computer-readable medium of claim 23 wherein the transmitting, receiving, determining, accumulating and indicating are performed by a network endpoint.

30. The tangible computer-readable medium of claim 23 wherein the transmitting the set of media test packets comprises varying sizes of the media test packets; and
varying transmission rate of the media test packets.

31. An apparatus for evaluating routing of a switching network, comprising:

means within a first network endpoint for generating media test packets with each of the media test packets comprising information for defining a different level of routing service selected from one or both of a routing priority or a drop precedence;

means within the first network endpoint for transmitting the media test packets and media packets with each of the media packets comprising information for defining level of routing service to the switching network;

means within the switching network for communicating the media packets and media test packets to a second network endpoint;

means within the second network endpoint for receiving the communicated media packets and media test packets;

means within the second network endpoint for re-transmitting the received media test packets back to the first network endpoint via the switching network;

means within the first network endpoint for determining the re-transmitted media test packets with communication problems;

means within the first network endpoint for statistically accumulating the re-transmitted media test packets with communication problems by level of routing service; and means within the first network endpoint for indicating a routing problem upon higher level of routing service media test packets with communication problems having a greater statistical occurrence than lower level of routing service media test packets with communication problems wherein the indicated problem is that the switching network is not correctly configured for the higher level of routing service.

32. The apparatus of claim 31 wherein the level of routing service is defined by DiffServ code points.

33. The apparatus of claim 31 wherein the level of routing service is defined by TOS precedence.

34. The apparatus of claim 31 wherein the communication problems are selected from one or both of packet drop rate problems or sequence problems.

* * * * *